United States Patent
Akagi et al.

[11] Patent Number: 6,156,187
[45] Date of Patent: Dec. 5, 2000

[54] ELECTROLYTIC INTEGRATED POLISHING METHOD FOR EXTERNAL SURFACE OF METALLIC TUBES AND PHOTOSENSITIVE DRUM SUBSTRATE PREPARED THEREBY

[75] Inventors: Kazuo Akagi; Akira Hashimoto; Youji Azuma; Masafumi Tomita, all of Shimonoseki, Japan

[73] Assignee: Nissin Unyu Kogyo Co., Ltd., Shimonoseki, Japan

[21] Appl. No.: 09/323,690

[22] Filed: Jun. 2, 1999

[30] Foreign Application Priority Data

Jun. 5, 1998 [JP] Japan .................. 10-157749

[51] Int. Cl.$^7$ ...................................... C25F 3/00
[52] U.S. Cl. .............................................. 205/663
[58] Field of Search .................. 205/663, 704, 205/686

[56] References Cited

U.S. PATENT DOCUMENTS 4,294,673  10/1981  Kimoto et al. ............ 204/129.46
5,321,889   6/1994  Watanabe .................... 29/895.3

FOREIGN PATENT DOCUMENTS 5-31628  2/1993  Japan .
6-720    1/1994  Japan .

Primary Examiner—Kathryn Gorgos
Assistant Examiner—Thomas H Parsons
Attorney, Agent, or Firm—Nixon Peabody LLP; David S. Safran

[57] ABSTRACT

To provide an electrolytic integrated polishing method for the external surface of metallic tubes, wherein both dimensional precision such as roundness or the like and product yield can be improved, and aluminum alloy photosensitive drum substrates prepared thereby. A metallic tube, both ends of which are supported, is positively charged and rapidly rotated about the axis thereof. More than one grindstone are pressed with a constant pressure against the external surface of the metallic tube from opposite directions or radial directions having the rotation axis as the center of rotation. Negative pole electrodes are disposed so as to sandwich the grindstones along a circular direction to perform electrolytic integrated polishing by supplying electrolyte to the external surface of the metallic tube. High-precision mirror processing of the external surface of the metallic tube can be performed by an integrating abrasion effect for eliminating a passivation coating formed on the external surface of the metallic tube by the grindstones and intensive electrolytic elution by the electrolyte.

7 Claims, 4 Drawing Sheets

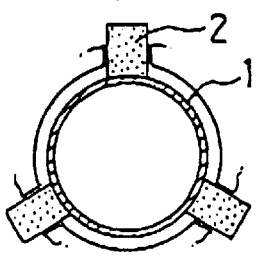
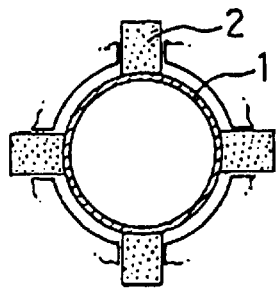
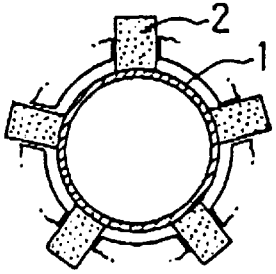
Fig. 4(a)　Fig. 4(b)　Fig. 4(c)
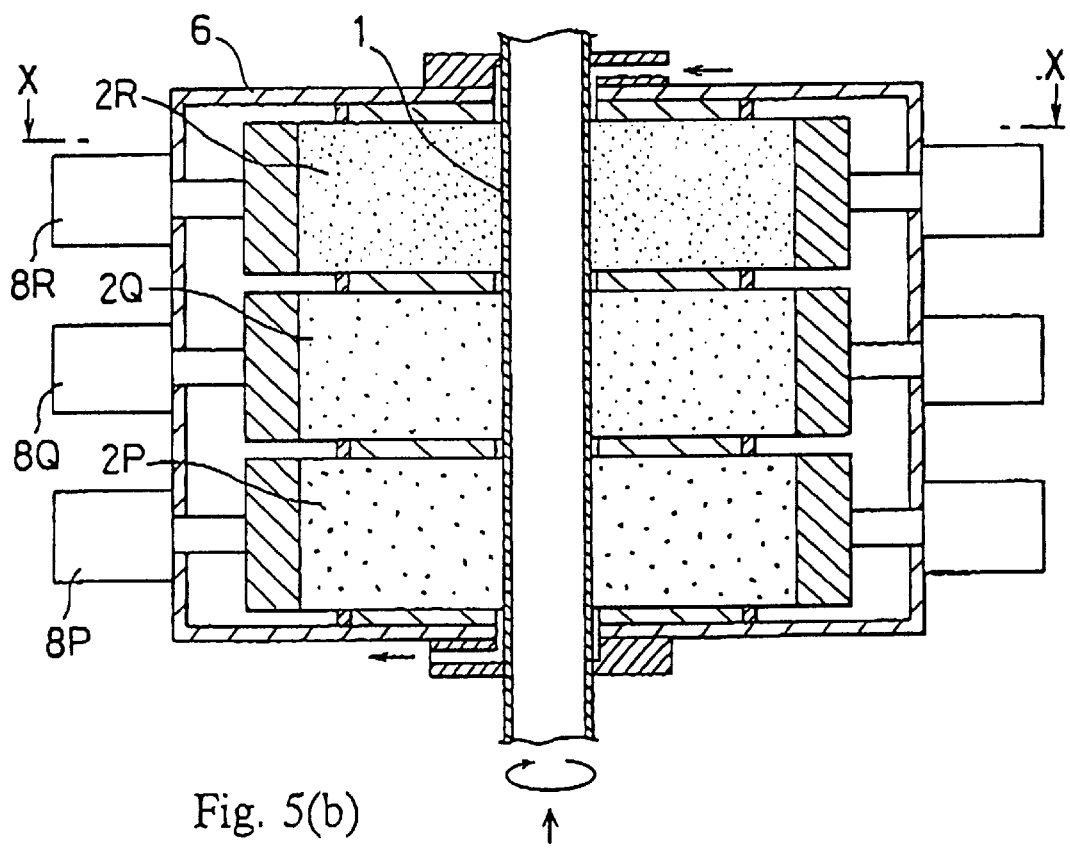
Fig. 5(a)
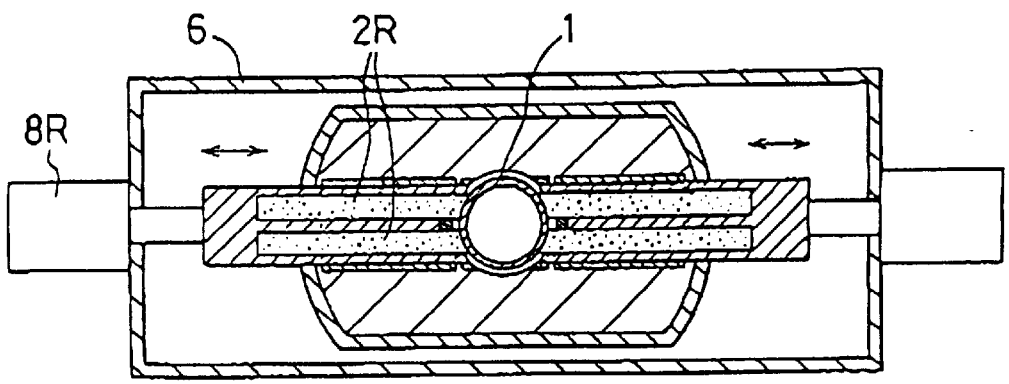
Fig. 5(b)

ELECTROLYTIC INTEGRATED POLISHING METHOD FOR EXTERNAL SURFACE OF METALLIC TUBES AND PHOTOSENSITIVE DRUM SUBSTRATE PREPARED THEREBY

BACKGROUND OF THE INVENTION

1. Field of the Invention

The present invention relates to an electrolytic integrated polishing method for the external surface of metallic tubes and aluminum alloy photosensitive drum substrates prepared thereby.

2. Description of the Related Art

Previously, electrolytic integrated polishing is known as a method for mirror processing of the external surface of metallic tubes. The electrolytic integrated polishing method, wherein an abrasive such as a grindstone or the like works as a negative pole, a metallic tube to be processed works as a positive pole, and electrolyte is supplied for polishing, performs mirror finishing of the external surface of the metallic tube by an integration of an abrasion effect by the abrasive and electrolysis by the electrolyte. (See, for example, Japanese Patent Laid-Open Publication No. Hei 5-31628 and Japanese Patent Laid-Open Publication No. Hei 6-720.)

SUMMARY OF THE INVENTION

Although the conventional electrolytic integrated polishing method is effective for metallic tubes made from base materials such as stainless steel, carbon steel or the like, it is not effective for metallic tubes made from aluminum alloy used for OPC (Organic Photo Conductor) photosensitive drums.

Metallic tubes made from aluminum alloy tend to have surface defects, intrinsic with aluminum materials because of their softness, caused by plucking or sticking abrasive grain during grinding with abrasives, which leads to the incapability of ensuring the quality required for OPC photosensitive drums. In order to make an OPC photosensitive drum highly sensitive, OPC must be coated lightly and uniformly on the surface of the substrate. Therefore a high-precision mirror processing is required for the surface of the metallic tube which is to be the substrate.

There have been problems with the conventional electrolytic integrated polishing method such as frequently occurring surface defects such as plucking, sticking, or the like; poor dimensional precision such as roundness or the like; or declining product yield, because electrodes for the electrolytic effect and abrasives for grinding work separately, and disposition of abrasives for the metallic tubes is unbalanced.

It is an object of the present invention to provide an electrolytic integrated polishing method for the external surface of metallic tubes, wherein high-precision mirror processing of the external surface of metallic tubes especially made from aluminum alloy can be performed to prevent surface defects, required quality for OPC photosensitive drums can be adequately ensured, and both dimensional precision such as roundness or the like and product yield can be improved, an to provide aluminum alloy photosensitive drum substrates formed thereby, in order to solve the existing problems mentioned above.

As a means to achieve the object, the present invention is outlined as an electrolytic integrated polishing method for the external surface of metallic tubes comprising the steps of positively charging and rotating a metallic tube about the axis thereof as well as supporting both ends of the tube; pressing more than one grindstone with a constant pressure against the external surface of the metallic tube from opposite directions or radial directions having the rotation axis as the center of rotation; disposing negative pole electrodes so as to sandwich the grindstones along a circular direction; supplying electrolyte to the external surface of the above-mentioned metallic tube form an electrolyte supply mechanism; and performing high-precision mirror processing of the external surface of the above mentioned metallic tube by integrating the abrasion effect by the above-mentioned grindstones for eliminating a passivation coating formed on the external surface of the metallic tube and intensive electrolytic elution by the electrolyte.

Besides, the present invention can also be outlined as an electrolytic integrated polishing method for the external surface of metallic tubes further comprises the steps of moving the above mentioned metallic tube along the axis direction, while rotating the tube about the axis thereof; or fluctuating a housing supporting the above mentioned grindstone along the axis direction of the metallic tube; or combining the movement of the metallic tube and the fluctuation of the above mentioned housing, and that the above mentioned grindstones, having different abrasive grains, are disposed in more than one column along the axis direction of the metallic tube with a predetermined interval, and grindstones in each column are disposed on locations which are rotated by a predetermined degree along the circular direction so that grindstones in every other column come in alignment.

Furthermore, the present invention can also be outlined by an aluminum alloy photosensitive drum substrate prepared by the electrolytic integrated polishing method for the external surface of the metallic tubes as above.

BRIEF DESCRIPTION OF THE DRAWINGS

FIGS. 4(a)–(c) illustrate example other than dispositions of grindstones along opposite directions, where (a) shows a disposition of three grindstones, and (b) shows four grindstones disposed in a cruciform, and (c) shows a disposition of five grindstones.

FIGS. 5(a)–(b) illustrates an example of a disposition of grindstones having different abrasive grains in more than one column, where (a) is a brief cross sectional view along the vertical axis, and (b) is a cross-sectional view of (a) along X—X.

DETAILED DESCRIPTION OF THE INVENTION

Embodiments of the present invention will be described in detail hereinafter with reference to the accompanying drawings.

Figure 1:
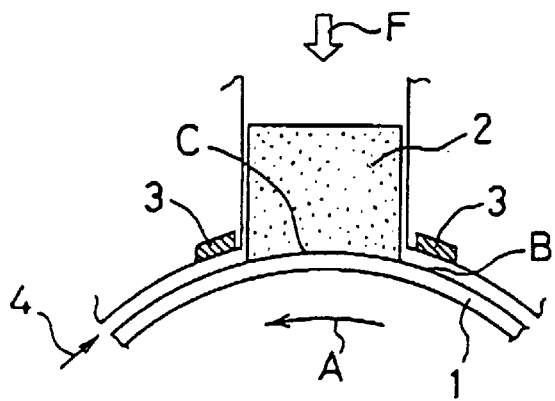
FIG. 1 is a schematic diagram illustrating the basic principle of an electrolytic integrated polishing method according to the present invention.

FIG. 1 shows the basic principle of an electrolytic integrated polishing method according to the present invention, wherein electrolytic integrated polishing is performed by pressing a grindstone 2 with a constant pressure F against the external surface of an aluminum alloy metallic tube 1 to be processed, disposing negative pole electrodes 3 along a circular direction to sandwich the grindstone 2, positively charging the metallic tube 1 to be rotated rapidly about the axis toward a direction shown by an arrow A, and supplying electrolyte 4 on the external surface of the metallic tube.

Immediately before the above mentioned grindstone 2 begins grinding by an abrasion effect, a thin passivation coating B is formed on the surface of the metallic tube 1 by the electrolytic effect of electrolyte 4. The grindstone 2 eliminates the passivation coating B without causing clogging by performing grinding on the passivation coating B to expose metallic base C of the metallic tube 1. Immediately after that, electrolytic current is concentrated to the height of the exposed surface of the metallic base, which results in intensive elution of the height by selective electrolysis, and the external surface of the metallic tube 1 is smoothed. Controlling the ration of the generated area of passivation coating and intensive elution respectively, i.e. the grinding effect and the electrolytic effect, is possible by adjusting the size of the above mentioned negative pole electrode 3.

Figure 2A:
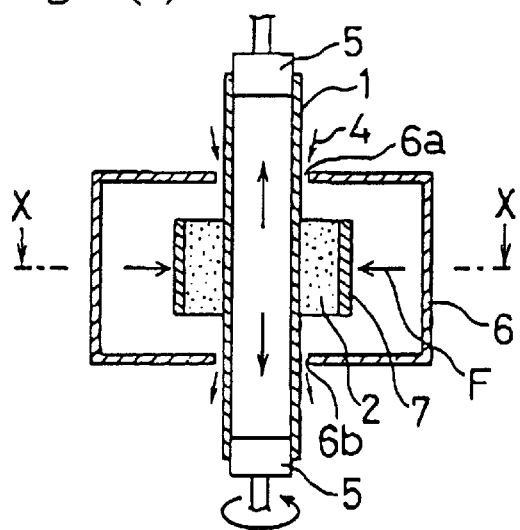
FIGS. 2(a)–(c) illustrate an example of the electrolytic integrated polishing method according to the present invention, where (a) is a brief cross sectional view along the vertical axis, (b) is a cross-sectional view of (a) along X—X, and (c) is a brief cross sectional view of a fluctuation method along the vertical axis.
Figure 2B:
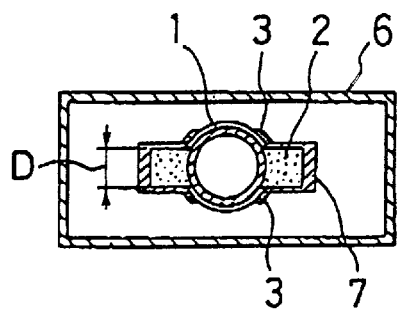
Figure 2C:
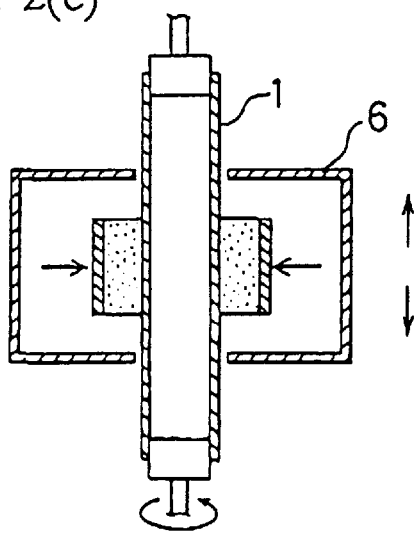

FIGS. 2 (a) and (b) show an example of the electrolytic integrated polishing method according to the present invention, wherein both ends of the metallic tube 1 are supported by a support member 5, the metallic tube 1 is positively charged through the support member 5, and the metallic tube 1, rapidly rotating about the axis, is vertically movable inside a housing 6 for supporting the grindstones 2.

The grindstones 2, removably attached to a grindstone holder 7, are disposed along opposite directions toward the metallic tube 1, in other words, to sandwich the metallic tube 1 from both sides. On the tip portion of the grindstone holder 7, as shown in (b), the above mentioned negative pole electrodes 3, sandwiching the grindstones 2 along the circular direction, are respectively disposed along the axis direction of the metallic tube 1. Besides, a pair of grindstones 2 oppositely disposed are provided to respectively press against the external surface of the metallic tube 1 with a constant pressure via an appropriated elastic member or an actuator not shown. Setting the width D of the grindstones 2 at a range of 8 to 10 mm when the external diameter of the metallic tube 1 is θ30 mm enables efficient grinding without clogging.

The above mentioned electrolyte 4, supplied from a supply opening 6a provided at the upper portion of the housing 6, flows down the external surface of the metallic tube 1 performing electrolysis, and the liquid waste containing abrasive grain is discharged through a discharge opening 6b provided at the lower portion of the housing 6 so that no abrasive grain remains on the surface of the metallic tube 1. The liquid waste is sent to a precipitation tank of the electrolyte supply system (not shown), and, after being filtered and cleaned, will be sent as electrolyte again to the supply opening 6a of the housing 6.

Electrolytic integrated polishing of the external surface of the metallic tube 1 is thus performed by supplying electrolyte and vertically moving the metallic tube 1 which is rapidly rotating. In the electrolytic integrated polishing, the above mentioned housing 6 may be vertically fluctuated as shown in FIG. 2 (c) instead of moving the metallic tube 1, or the movement of the metallic tube 1 may be combined with the fluctuation of the housing 6. These types of polishing, i.e. those by movement, by fluctuation, or by a combination of both methods, con be selectively used according to the quality level (surface roughness) required for the products.

Figure 3A:
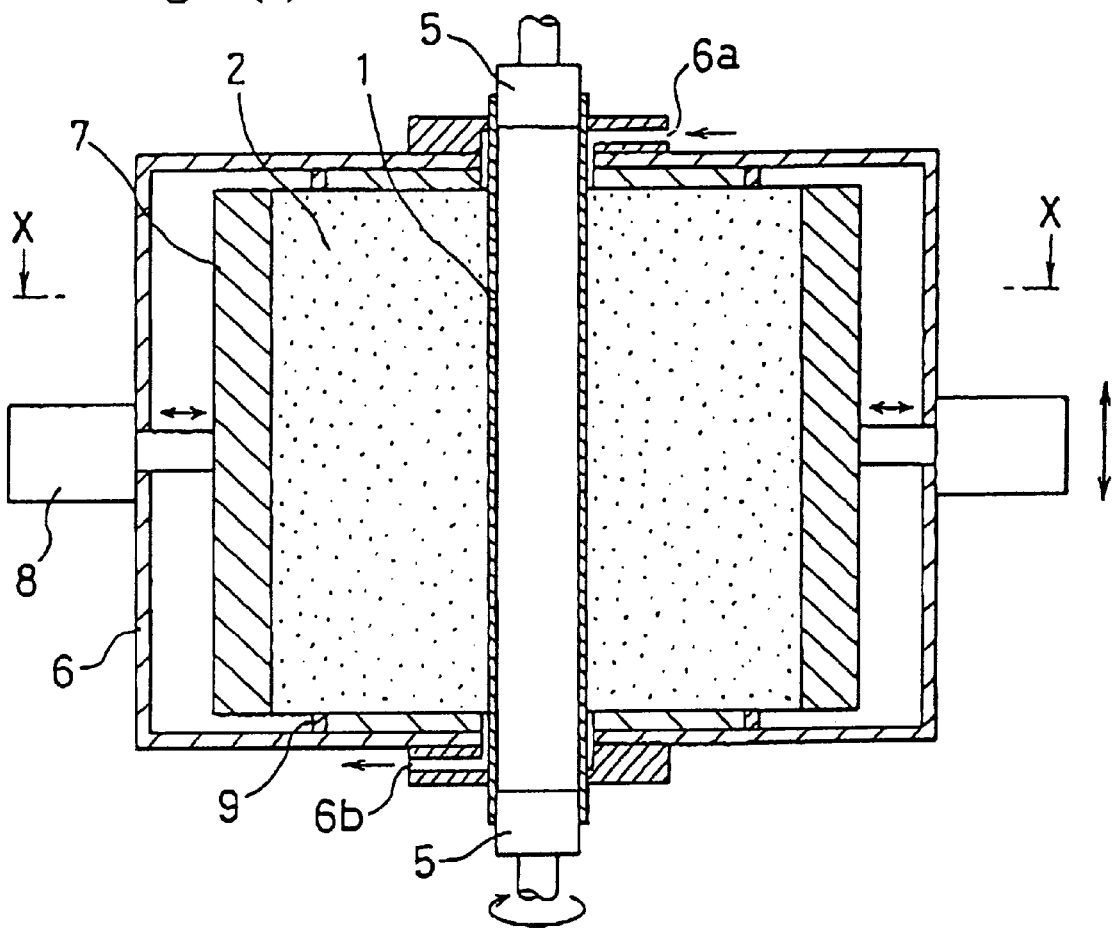
FIGS. 3(a)–(b) illustrate an example of the electrolytic integrated polishing method according to a fluctuation method, where (a) is a brief cross sectional view along the vertical axis, and (b) is a cross-sectional view of (a) along X—X.
Figure 3B:
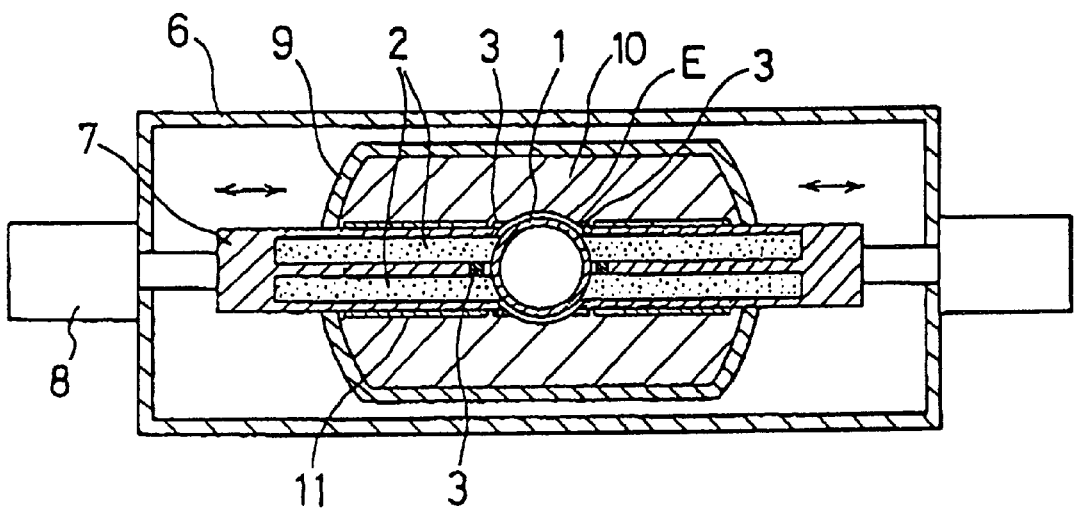

FIGS. 3 (a) and (b) show an example of the electrolytic integrated polishing method according to the fluctuation method, wherein the metallic tube 1, the upper and the lower portions of which are supported by the support member 5, is positively charged and rapidly rotating, the grindstones 2 disposed along opposite directions and removably attached to the grindstone holder 7 are pressed with a constant pressure against the external surface of the metallic tube 1 by an actuator 8 disposed at the side of the housing 6. In this case, two plate-shaped grindstones composing a pair are used for the grindstones, 2, which are movably supported by a support frame 9 fixed inside the above mentioned housing 6.

In the above mentioned support frame 9, a case 10 composed of anticorrosion material having a groove, cross section of which is circular as shown in FIG. 3 (b), is disposed so as to sandwich the metallic tube 1, an electrolyte passage E is disposed between the case 10 and the metallic tube 1, the upper end of the electrolyte passage E communicates with the supply opening 6a of the housing 6, and the lower end communicated with the discharge opening 6b. Furthermore, the negative electrodes 3 are respectively attached to both ends (adjacent to the contacting portion between the grindstone 2 and the metallic tube 1) of the groove of the case 10, while the negative electrodes 3 are also attached between the two grindstones 2. Unit 11 is a glass plate, disposed at both sides, sandwiching the above mentioned grindstone holder 7, for reducing the friction force which occurs during the polishing. Unit 11 may be of other materials provided that they show outstanding sliding characteristics.

The housing 6, composed to be fluctuable by an appropriate fluctuation mechanism (not shown), fluctuates vertically to the metallic tube 1 which is rapidly rotating about the axis, electrolyte is supplied form the above mentioned supply opening 6a, and the electrolyte is passed through the electrolyte passage E, allowing electrolytic integrated polishing of the external surface of the metallic tube 1.

In the method according to the present invention, instead of disposing the grindstones 2 along opposite directions more than on grindstone may be pressed with a constant pressure from radial directions having the rotation axis of the metallic tube 1 as the center of rotation. For example, three grindstones 2 may be disposed, 120 degrees apart from each other, along the circular direction of the metallic tube 1 as shown in FIG. 4 (a), four grindstones 2 may be disposed in a cruciform, 90 degrees apart from each other, along the circular direction of the metallic tube 1 as shown in (b), five grindstones 2 may be disposed, 72 degrees apart from each other, along the circular direction of the metallic tube 1 as shown in (b).

These disposition are particularly effective for wide tubes or long tubes, diameters of which are θ30 mm or more. Although increasing the number of grindstones 2 improves work efficiency and roundness of the products, it also raises the cost and takes up more space due to increased integrity of the apparatus structure, which required consideration of production conditions to make an appropriate selection.

In the case with substrates for photosensitive drums, it is essential to perform polishing of short-length products (approximately form 250 to 300 mm) with high efficiency and low cost. Therefore, disposing the grindstones along opposite directions according to the present invention takes up less space so that many-in-one type (for example, five rows) apparatuses can be used to enable simultaneous polishing of many tubes and achieve higher efficiency and lower cost.

FIGS. 5 (a) and (b) illustrate an example of disposing grindstones having different abrasive grains in more than one column, along the axis direction of the metallic tube 1, wherein the grindstones 2P for coarse polishing, 2Q for intermediate polishing, and 2R for finishing are disposed in the housing 6, from bottom to top, along opposite directions, respectively. Additionally, actuators 8P, 8Q, and 8R, corresponding to the grindstone respectively, are also disposed. According to the electrolytic polishing method, the three processings, i.e. coarse polishing by the coarse grindstones 2P, intermediate polishing by the intermediate grindstones 2Q, and finishing by the finishing by the finishing grindstones 2R, can be performed by moving the metallic tube 1 which is rapidly rotating about the axis only once in the housing 6 from bottom to top. Thus an efficient mirror finishing processing becomes possible.

Figure 6A:
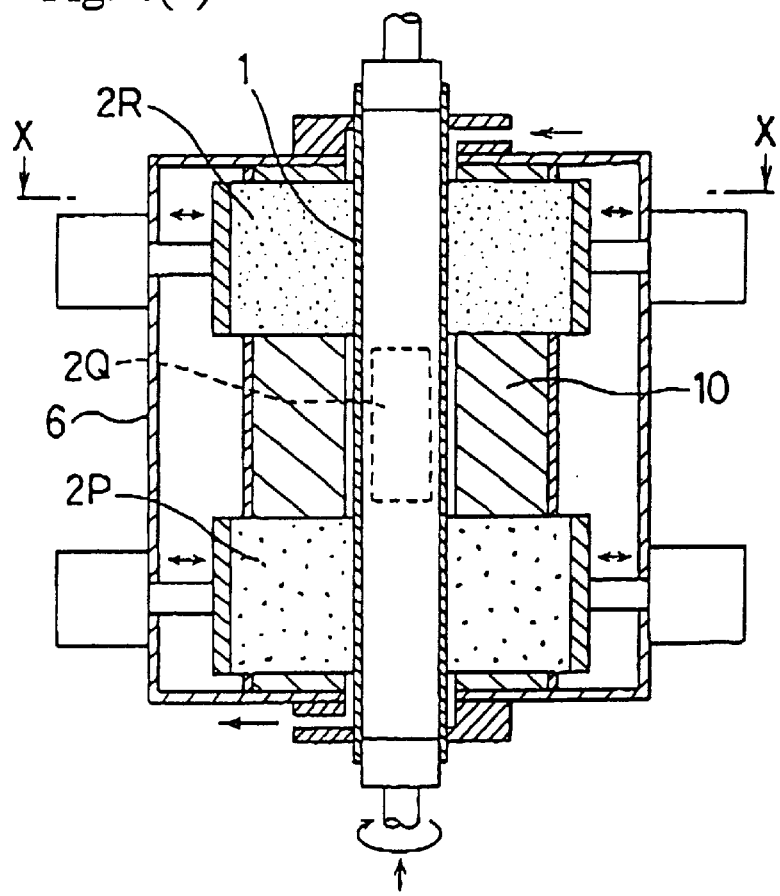
FIGS. 6(a)–(b) illustrate an example of a disposition by which the grindstones in every other column come in alignment, where (a) is a brief cross sectional view along the vertical axis, and (b) is a cross-sectional view of (a) along X—X.
Figure 6B:
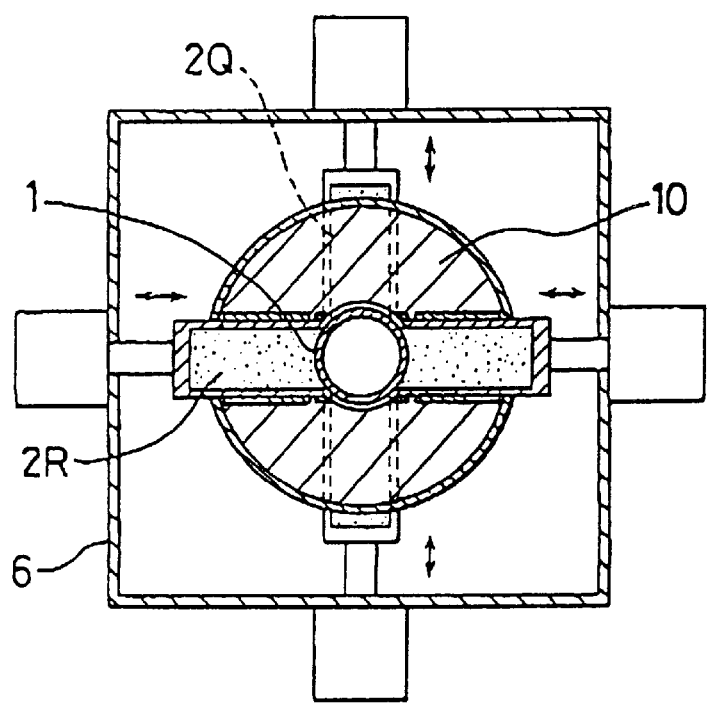

Although the example shown in FIGS. 6 (a) and (b) is similar to FIG. 5 in that three types of grindstones having different abrasive grains are disposed in more than one column, it differs in that grindstones in each column, not facing the same direction, are disposed at a position which is rotated by 90 degrees along the circular direction of the metallic tube 1 so that grindstones in every other column come in alignment. That is, the coarse grindstones 2P at the lower portion of the housing 6, disposed along opposite directions, are in alignment with the finishing grindstones 2R at the upper portion, whereas the intermediate grindstones 2Q are disposed along opposite directions at a position which is rotated by 90 degrees along the circular direction. In this case, a hole is made in the middle portion of the above mentioned case 10 for passing the intermediate grindstones 2Q.

In a method using three types of grindstones having different abrasive grains, other than disposing the grindstones in each column along opposite directions, three to five grindstones may be disposed in the same column as shown in FIGS. 4 (a) to (c). Besides, grindstone sin each column need not be facing the same direction by may be disposed at a position which is rotated along the circular direction by a predetermined degree so that grindstones in every other column come in alignment.

Furthermore, it is possible to appropriately select the combination of abrasive grains of the grindstones for the three stage disposition of coarse, intermediate, and finishing grindstones according to the quality level required for the products. The number if columns is not limited to three, and more than one column for each processing stage can be provided according to the length of the metallic tube 1.

According to the present invention, the aluminum alloy metallic tube which has gone through electrolytic integrated polishing is mirror processed with high precision without surface defects on the external surface. By coating thin film (about 20 pm) of OPC on the external surface thereof, photosensitive drums for copier machines, facsimiles, or the like can be made.

Now, the method according to the present invention is effective for photosensitive drum substrates formed by means other than OPV coating and it can be adequately applied to metallic tubes made from materials other than aluminum alloy.

The method according to the present invention, as described above, is an electrolytic integrated polishing method wherein an abrasion effect by the grindstone and electrolysis by the electrolyte are integrated unlike the prior art, thus very high precision mirror processings can be performed without occurrence of surface defects such as plucking, sticking, or the like on the external surface of metallic tubes made from soft aluminum alloy, and products with high dimensional precision such as roundness or the like and high yield can be produced with high efficiency by balancing the disposition of the grindstones with deviation. According to the present invention, therefore, ideal OPC photosensitive drum substrates can be provided.

What is claimed is:

1. An electrolytic integrated polishing method for the external surface of metallic tubes comprising the steps of positively charging and rotating a metallic tube about the axis thereof and supporting both ends of the tube, pressing more than one grindstone with a constant pressure against the external surface of the metallic tube from opposite directions or radial directions having the rotation axis as the center of rotation, disposing negative pole electrodes so as to sandwich the grindstones along a circular direction, supplying electrolyte to the external surface of said metallic tube from an electrolyte supply mechanism, and performing high-precision mirror processing of the external surface of said metallic tube by integrating an abrasion effect by said grindstones for eliminating a passivation coating formed on the external surface of the metallic tube and intensive electrolytic elution by the electrolyte.

2. The electrolytic integrated polishing method for the external surface of metallic tubes according to claim 1, further comprising the steps of moving said metallic tube along the axis direction, while rotating said metallic tube about the axis thereof, or fluctuating a housing supporting said grindstone along the axis direction of the metallic tube; or combining the movement of the metallic tube and the fluctuation of the housing.

3. The electrolytic integrated polishing method for the external surface of metallic tubes according to claim 2, wherein said grindstones, having different abrasive grains, are disposed in more than on columns; along the axis direction of the metallic tube with a predetermined interval, and grindstones in each column are disposed on locations which are rotated by a predetermined degree along the circular direction so that grindstones in every other column come in alignment.

4. An aluminum alloy photosensitive drum substrate formed by the electrolytic integrated polishing method for the external surface of metallic tubes according to claim 2.

5. The electrolytic integrated polishing method for the external surface of metallic tubes according to claim 1, wherein said grindstones, having different abrasive grains, are disposed in more than one column; along the axis direction of the metallic tube with a predetermined interval, and grindstones in each column are disposed on locations which are rotated by a predetermined degree along the circular direction so that grindstones in every other column come in alignment.

6. An aluminum alloy photosensitive drum substrate formed by the electrolytic integrated polishing method for the external surface of metallic tubes according to claim 3.

7. An aluminum alloy photosensitive drum substrate formed by the electrolytic integrated polishing method for the external surface of metallic tubes according to claim 1.

* * * * *